(12) United States Patent
Lin et al.

(10) Patent No.: US 8,823,669 B2
(45) Date of Patent: Sep. 2, 2014

(54) TOUCH PANEL, ANTI-NOISE UNIT AND METHOD FOR PROCESSING A NOISE

(75) Inventors: Yu-Ting Lin, Tainan (TW); Chun-Chieh Wang, Chiayi County (TW); Shih-Yuan Lung, Hsinchu County (TW); Chia-Chun Fang, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 97 days.

(21) Appl. No.: 13/527,851

(22) Filed: Jun. 20, 2012

(65) Prior Publication Data

US 2013/0176233 A1 Jul. 11, 2013

(30) Foreign Application Priority Data

Jan. 10, 2012 (TW) .............................. 101100961 A

(51) Int. Cl.
*G06F 3/041* (2006.01)

(52) U.S. Cl.
USPC ........................................................ 345/173

(58) Field of Classification Search
CPC ........... G06F 8/65; G06F 3/011; G06F 3/042; G06F 3/044; G06F 17/00; G06F 2203/0331; G06F 3/017; G06F 3/0325; G06F 3/041; G06F 3/0416; G06F 3/0425; G06F 3/03545; G06F 3/046; G06F 11/00; G06F 19/10; G06F 3/0418; G06F 3/0412
USPC .................................................. 345/173–183
See application file for complete search history.

(56) References Cited

U.S. PATENT DOCUMENTS

| 2006/0017701 A1 | 1/2006 | Marten et al. | |
| 2012/0056834 A1* | 3/2012 | Kim et al. | ..................... 345/173 |
| 2012/0249433 A1* | 10/2012 | Deng et al. | ..................... 345/173 |

FOREIGN PATENT DOCUMENTS

| CN | 101858941 A | 10/2010 |
| TW | M363639 U | 8/2009 |

* cited by examiner

*Primary Examiner* — Kevin M Nguyen
*Assistant Examiner* — Kenneth B Lee, Jr.
(74) *Attorney, Agent, or Firm* — Muncy, Geissler, Olds & Lowe, P.C.

(57) ABSTRACT

A touch panel includes a display module, a touch sensor, an anti-noise unit and a signal processing unit. The display module generates a noise. The touch sensor is disposed above the display module and outputs an abnormal signal, wherein the abnormal signal includes the noise and a sensing signal. The anti-noise unit is adapted to receive the abnormal signal and then reject the noise so as to form the sensing signal. The signal processing unit is adapted to process the sensing signal.

8 Claims, 6 Drawing Sheets

TOUCH PANEL, ANTI-NOISE UNIT AND METHOD FOR PROCESSING A NOISE

CROSS-REFERENCE TO RELATED APPLICATION

This application claims the benefit of Taiwan Patent Application No. 101100961, filed on Jan. 10, 2012, which is hereby incorporated by reference for all purposes as if fully set forth herein.

BACKGROUND OF THE INVENTION

1. Field of Invention

The present invention relates to a touch panel, and more particularly to a touch panel which can reject a noise.

2. Related Art

Recently, the technology of a touch panel is developed quickly. For example, resistance type touch panel, capacitance type touch panel, sound wave type touch panel and optics type touch panel have been widely applied to communication products, computer devices and consumptive electronic products so as to further increase the efficiency and convenience of the applied electronic product.

The optics type touch panel can input a signal by a finger so as to have convenience of input operation, wherein the input operation does not need to press the touch panel. Thus, this touch panel has no disadvantage of a stress caused by repeatedly touching the touch panel, and a damage caused by deformation. Also, this touch panel has simple constitution, less components, and high yield rate of the product so as to decrease the cost by suitably using the mass production.

FIG. 1 is a view showing a basic constitution of conventional touch sensor 100. A glass substrate 110 and an indium tin oxide (ITO) layer 130 are boned by an optically clear adhesive (OCA) 120 located therebetween. Furthermore, the indium tin oxide (ITO) layer 130 and a cover lens 140 are boned by another OCA 120 located therebetween, thereby finishing the touch sensor 100.

FIG. 2 is a view showing a basic constitution of conventional touch panel 200. A touch sensor 100 is disposed above a liquid crystal display (LCD) module 250 so as to finish the touch panel 200. For example, the glass substrate 110 of the touch sensor 100 is bonded to the LCD module 250, and there is an air gap 260 between the LCD module 250 and the glass substrate 110.

FIG. 3 is a block diagram showing signal processing of the conventional touch panel. During touching, a touch sensor 100 senses variances in capacitance value and then outputs an analog signal to an analog multiplexer 320. The analog multiplexer 320 outputs the scanned analog signal to an analog/digital converter 330 by means of a scanning action. The analog/digital converter 330 converts the analog signal to digital signal, and then outputs the digital signal to a microcontroller 340. The microcontroller 340 processes the digital signal, and then outputs a control signal. Finally, the control signal transmitted to an operating system 360 through an interface 350 so as to calculate and then determine a touch position.

However, after the touch sensor is installed on the LCD module, a noise generated by the LCD module interferes with the touch sensor so as to cause the touch panel to wrong determine the touch position. The noise is resulted from the couple effect between a common voltage of the LCD module and data lines, e.g. particularly in a heavy loading picture or fast renewed picture so as to cause the picture to be unstable. Recently, a general method is to adjust a firmware so as to solve the problem of wrong determining the touch position. For example, the frequency that is converted from analog to digital is adjusted, and an algorithm of the microcontroller for processing signals is adjusted. However, this adjusting method will extend the processing time of the sensing signal from touch sensor to the operating system.

Therefore, it is required to provide an anti-noise touch panel capable of solving the forgoing problems.

SUMMARY OF THE INVENTION

The present invention is directed to a touch panel, including a display module, a touch sensor, an anti-noise unit and a signal processing unit. The display module generates a noise. The touch sensor is disposed above the display module and outputs an abnormal signal, wherein the abnormal signal includes the noise and a sensing signal. The anti-noise unit is adapted to receive the abnormal signal and then reject the noise so as to form the sensing signal. The signal processing unit is adapted to process the sensing signal.

The compared signal outputted by the comparison circuit of the anti-noise unit of the present invention is the high level signal or low level signal of the normal sensing signal of the touch sensor, i.e., the anti-noise unit of the present invention certainly rejects the noise of the abnormal signal and transmits the normal sensing signal, whereby the noise generated by the LCD module which interferes with the touch sensor do not cause the touch panel to wrong determine the touch position. Thus, it is not necessary that the analog-to-digital converting frequency is adjusted and the algorithm of the microcontroller for processing signals is adjusted to solve the problem of wrong determining the touch position, whereby the touch panel of the present invention will not extend the processing time of the sensing signal from touch sensor to the operating system.

In order to make the aforementioned and other objectives, features and advantages of the present invention comprehensible, embodiments are described in detail below with reference to the accompanying drawings.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
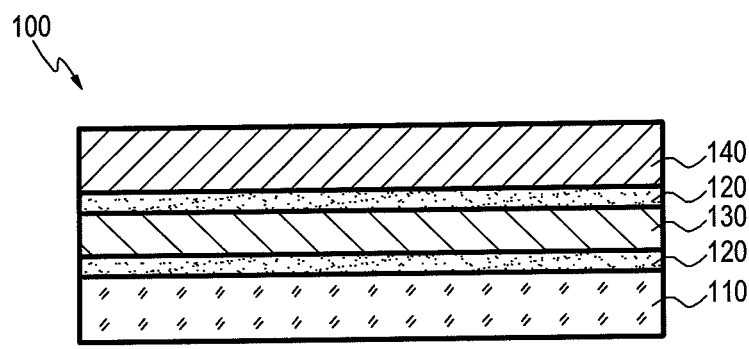
FIG. 1 is a view showing a basic constitution of conventional touch sensor.
Figure 2:
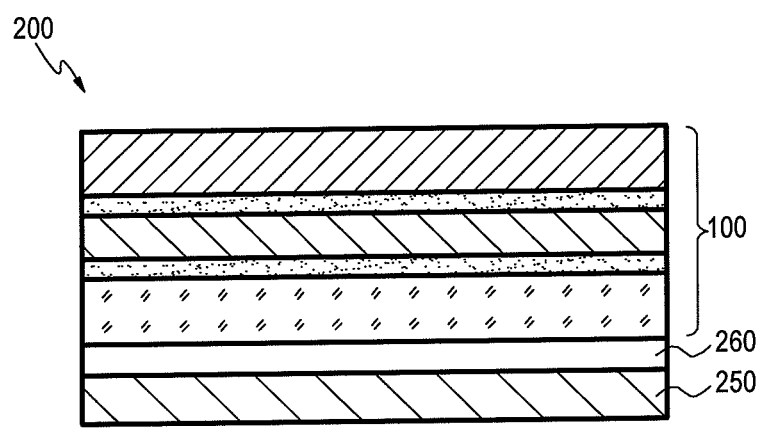
FIG. 2 is a view showing a basic constitution of conventional touch panel.
Figure 3:
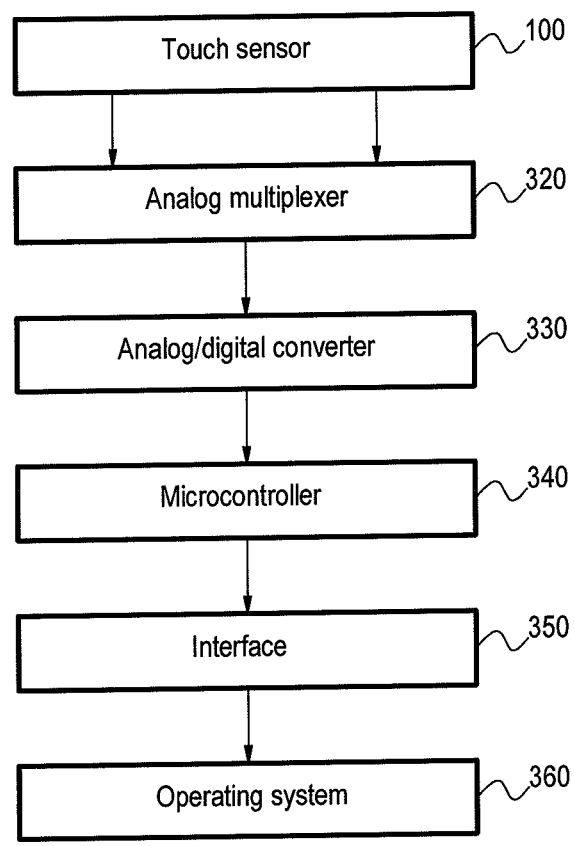
FIG. 3 is a block diagram showing signal processing of the conventional touch panel.
Figure 4:
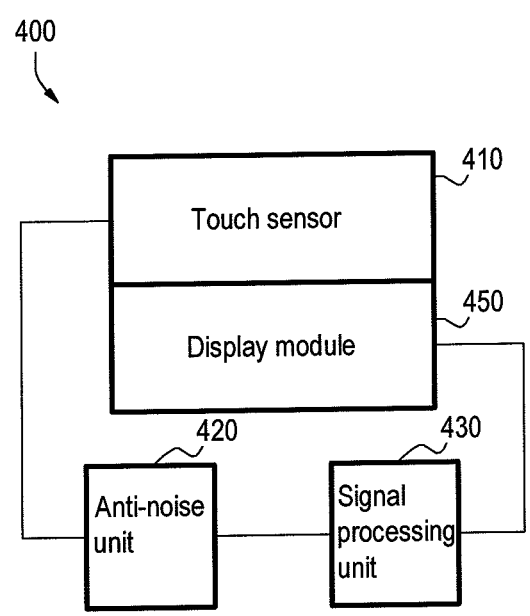
FIG. 4 is a block diagram showing a constitution of a touch panel having an anti-noise unit according to an embodiment of the present invention.

FIG. 4 is a block diagram showing a constitution of a touch panel having an anti-noise unit according to an embodiment of the present invention. A touch sensor 410 is disposed above a display module 450 (e.g. liquid crystal display module). When the touch sensor 410 outputs a sensing signal, a noise (e.g. common voltage coupling signal) generated by the display module 450 interferes with the touch sensor 410 so as to change the sensing signal to an abnormal signal, i.e., the abnormal signal includes the normal sensing signal and the noise. The touch sensor 410 transmits the abnormal signal to an anti-noise unit 420. The anti-noise unit 420 receives the abnormal signal of the touch sensor 410 and then rejects the noise of the abnormal signal so as to form normal sensing signal (i.e. the original sensing signal), and the normal sensing signal is transmitted to a signal processing unit 430. The signal processing unit 430 is adapted to process the normal sensing signal.

Figure 5:
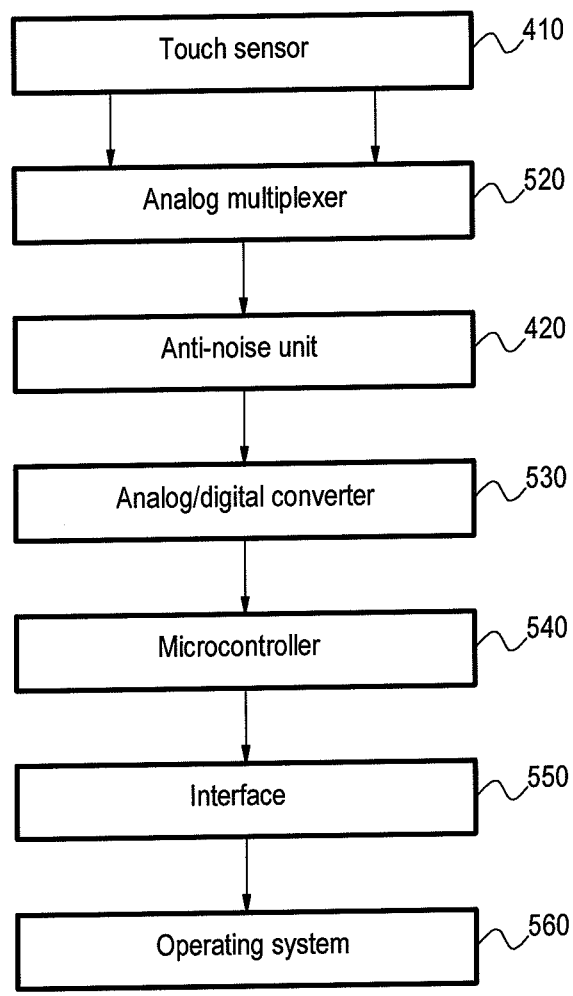
FIG. 5 is a block diagram showing signal processing of a touch panel having an anti-noise unit according to an embodiment of the present invention.

Referring to FIG. 5, particularly, the signal processing unit 430 includes an analog multiplexer 520, an analog/digital converter (ADC) 530, a microcontroller 540, an interface 550 and an operating system 560. Originally, the touch sensor 410 outputs the sensing signal, but the touch sensor 410 transmits the abnormal signal (i.e., the abnormal signal includes the sensing signal and the noise) to the analog multiplexer 520 because of the effect of the noise generated by the display module 450. The analog multiplexer 520 outputs the scanned abnormal signal to the anti-noise unit 420 by means of a scanning action. The anti-noise unit 420 changes the abnormal signal to the normal sensing signal, and then outputs the normal sensing signal to the analog/digital converter 530. The analog/digital converter 530 converts the normal sensing signal from the analog signal to digital signal, and then outputs the digital signal to the microcontroller 540. The microcontroller 540 processes the digital signal, and then outputs a control signal. Finally, the control signal is transmitted to the operating system 560 through the interface 550 so as to calculate and then determine a touch position. For example, the touch position is calculated by a change of the sensing signal resulted from variances in capacitance value during touching.

Figure 6:
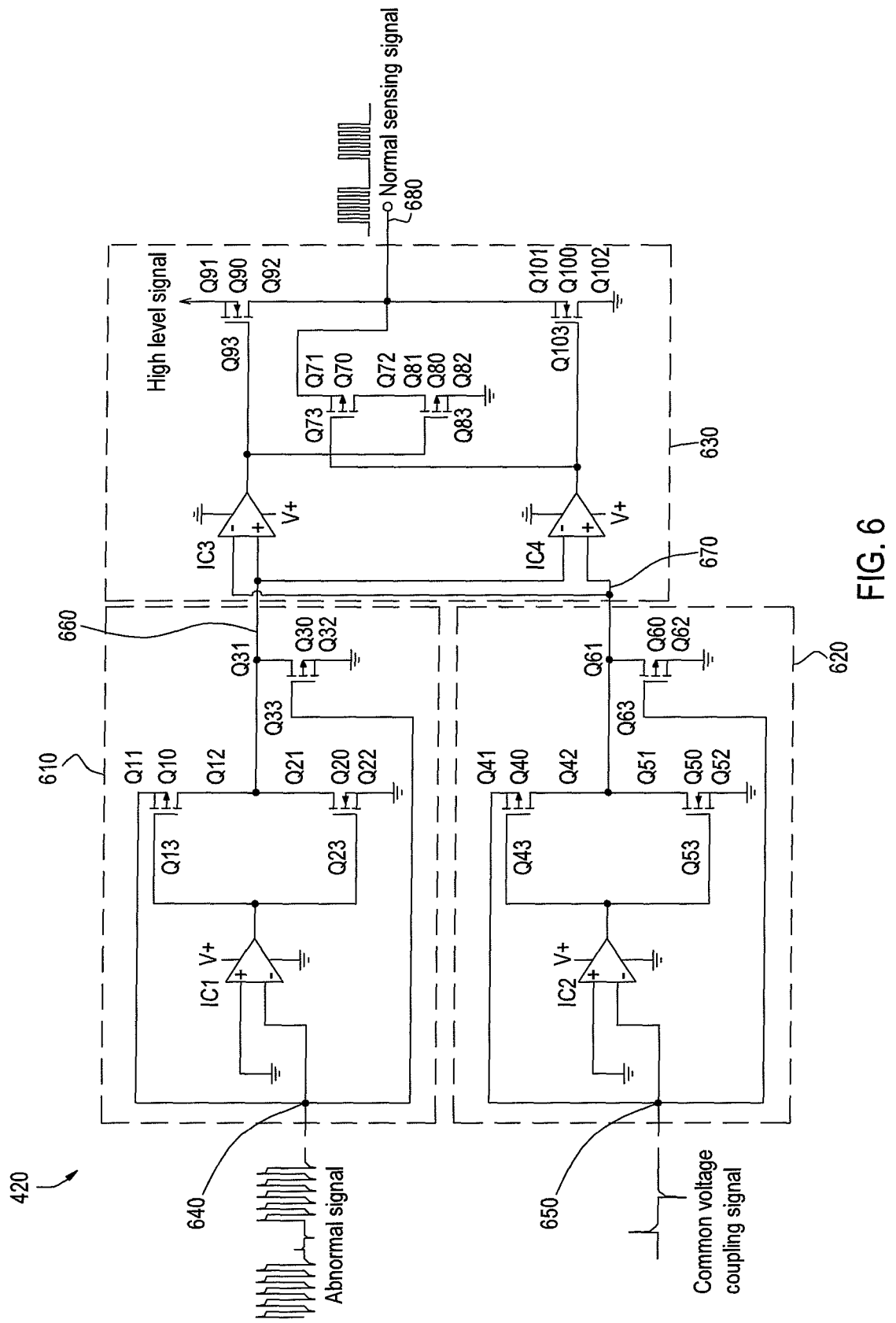
FIG. 6 is a circuit diagram of an anti-noise unit according to an embodiment of the present invention.

FIG. 6 is a circuit diagram of the anti-noise unit 420 according to an embodiment of the present invention. The anti-noise unit 420 includes a first filtering circuit 610, a second filtering circuit 620 and a comparison circuit 630. The first filtering circuit 610 includes a first operational amplifier IC1, a first switch Q10, a second switch Q20 and a third switch Q30. A positive phase input end of the first operational amplifier IC1 receives a reference voltage, and a negative phase input end of the first operational amplifier IC1 receives an abnormal signal 640 (e.g. the abnormal signal transmitted by the touch sensor). The first operational amplifier IC1 compares the abnormal signal 640 with the reference voltage, and an output end of the first operational amplifier IC1 outputs a compared result. The first switch Q10 includes a first end Q11, a second end Q12 and a control end Q13. The first end Q11 receives the abnormal signal 640. The second end Q12 outputs a first filtering signal 660. The control end Q13 is electrically connected to the output end of the first operational amplifier IC1, whereby the compared result outputted by the first operational amplifier IC1 can control whether the first end Q11 electrically contacts the second end Q12 of the first switch Q10 or not. The second switch Q20 includes a first end Q21, a second end Q22 and a control end Q23. The first end Q21 is electrically connected to the second end Q12 of the first switch Q10. The second end Q22 is electrically connected to the reference voltage. The control end Q23 is electrically connected to the output end of the first operational amplifier IC1, whereby the compared result outputted by the first operational amplifier IC1 can control whether the first end Q21 electrically contacts the second end Q22 of the first switch Q20 or not. The third switch Q30 includes a first end Q31, a second end Q32 and a control end Q33. The first end Q31 is electrically connected to the second end Q12 of the first switch Q10. The second end Q32 is electrically connected to the reference voltage. The control end Q33 receives the abnormal signal 640, whereby the abnormal signal 640 can control whether the first end Q31 electrically contacts the second end Q32 of the first switch Q30 or not.

The second filtering circuit 620 includes a second operational amplifier IC2, a fourth switch Q40, a fifth switch Q50 and a sixth switch Q60. A positive phase input end of the second operational amplifier IC2 receives the reference voltage, and a negative phase input end of the second operational amplifier IC2 receives a common voltage coupling signal 650 (e.g. the common voltage coupling signal 650 is a noise resulted from the couple effect between a common voltage of the LCD module and data lines). The second operational amplifier IC2 compares the common voltage coupling signal 650 with the reference voltage, and an output end of the second operational amplifier IC2 outputs a compared result. The fourth switch Q40 includes a first end Q41, a second end Q42 and a control end Q43. The first end Q41 receives the common voltage coupling signal 650. The second end Q42 outputs a second filtering signal 670. The control end Q43 is electrically connected to the output end of the second operational amplifier IC2, whereby the compared result outputted by the second operational amplifier IC2 can control whether the first end Q41 electrically contacts the second end Q42 of the fourth switch Q40 or not. The fifth switch Q50 includes a first end Q51, a second end Q52 and a control end Q53. The first end Q51 is electrically connected to the second end Q42 of the fourth switch Q40. The second end Q52 is electrically connected to the reference voltage. The control end Q53 is electrically connected to the output end of the second operational amplifier IC2, whereby the compared result outputted by the second operational amplifier IC2 can control whether the first end Q51 electrically contacts the second end Q52 of the fifth switch Q50 or not. The sixth switch Q60 includes a first end Q61, a second end Q62 and a control end Q63. The first end Q61 is electrically connected to the second end Q42 of the fourth switch Q40. The second end Q62 is electrically connected to the reference voltage. The control end Q63 receives the common voltage coupling signal 650, whereby the common voltage coupling signal 650 can control whether the first end Q61 electrically contacts the second end Q62 of the sixth switch Q60 or not.

The comparison circuit 630 includes a third operational amplifier IC3, a fourth operational amplifier IC4, a seventh switch Q70, a eighth switch Q80, a ninth switch Q90 and a tenth switch Q100. A positive phase input end of the third operational amplifier IC3 receives the first filtering signal 660 of the first filtering circuit 610, and a negative phase input end of the third operational amplifier IC3 receives the second filtering signal 670 of the second filtering circuit 620. The third operational amplifier IC3 compares the first filtering signal 660 with the second filtering signal 670, and an output end of the third operational amplifier IC3 outputs a compared result. A negative phase input end of the fourth operational amplifier IC4 receives the first filtering signal 660 of the first filtering circuit 610, and a positive phase input end of the fourth operational amplifier IC4 receives the second filtering signal 670 of the second filtering circuit 620. The fourth operational amplifier IC4 compares the first filtering signal 660 with the second filtering signal 670, and an output end of the fourth operational amplifier IC4 outputs a compared result. The seventh switch Q70 includes a first end Q71, a second end Q72 and a control end Q73. The control end Q73 is electrically connected to the output end of the fourth operational amplifier IC4, whereby the compared result outputted by the fourth operational amplifier IC4 can control whether the first end Q71 electrically contacts the second end Q72 of the first switch Q70 or not. The eighth switch Q80 includes a first end Q81, a second end Q82 and a control end Q83. The first end Q81 is electrically connected to the second end Q72 of the seventh switch Q70. The second end Q82 is electrically connected to the reference voltage. The control end Q83 is electrically connected to the output end of the third operational amplifier IC3, whereby the compared result of the third operational amplifier IC3 can control whether the first end Q81 electrically contacts the second end Q82 of the first switch Q80 or not. The ninth switch Q90 includes a first end Q91, a second end Q92 and a control end Q93. The first end Q91 is electrically connected to a high level signal (i.e., the high level signal is a high level of the normal sensing signal of the touch sensor 410). The second end Q92 is electrically connected to the first end Q71 of the seventh switch Q70 for outputting a compared signal 680. The control end Q93 is electrically connected to the output end of the third operational amplifier IC3, whereby the compared result of the third operational amplifier IC3 can control whether the first end Q91 electrically contacts the second end Q92 of the first switch Q90 or not. The tenth switch Q100 includes a first end Q101, a second end Q102 and a control end Q103. The first end Q101 is electrically connected to the second end Q92 of the ninth switch Q90 for outputting the compared signal 680. The second end Q102 is electrically connected to the reference voltage. The control end Q103 is electrically connected to the output end of the fourth operational amplifier IC4, whereby the compared result of the fourth operational amplifier IC4 can control whether the first end Q101 electrically contacts the second end Q102 of the first switch Q100 or not.

As described above, the first switch Q10, the third switch Q30, the fourth switch Q40, the sixth switch Q60, the seventh switch Q70 and the eighth switch Q80 are P-type field effect transistor, and the second switch Q20, the fifth switch Q50, the ninth switch Q90 and the tenth switch Q100 are N-type field effect transistor. The reference voltage is defined as a low level signal (the low level signal is the low level of the normal sensing signal of the touch sensor 410), e.g. 0 volt. The compared signal 680 outputted by the comparison circuit 630 is the high level or low level of the normal sensing signal of the touch sensor 410, i.e., the noise of the abnormal signal can be rejected so as to form the normal sensing signal.

Figure 7:
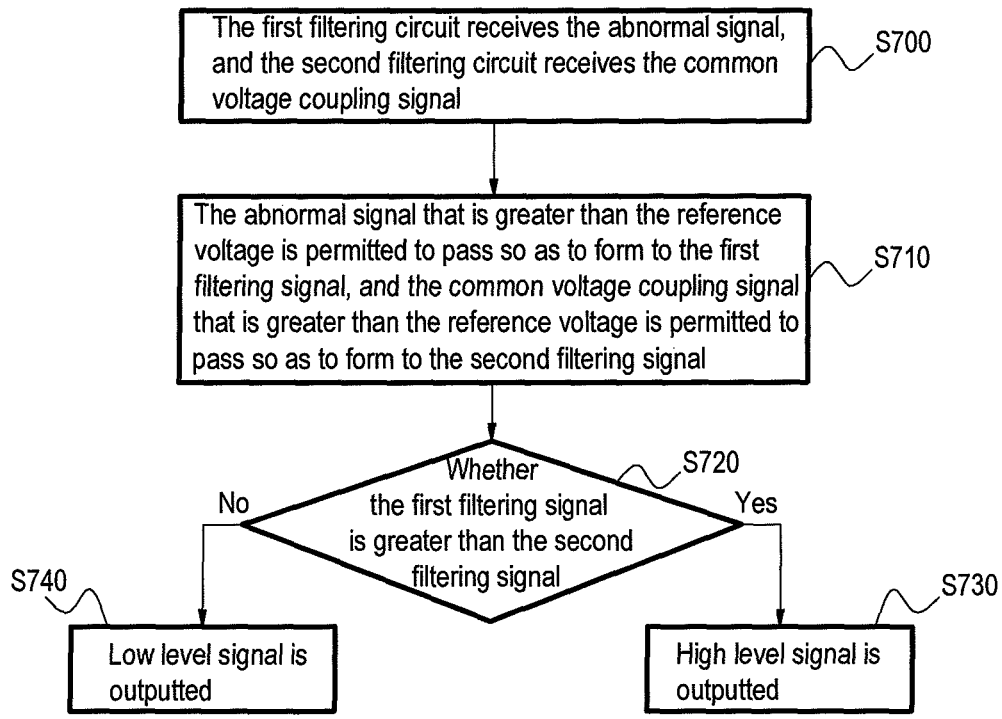
FIG. 7 is flow diagram of a method for processing noises of a touch panel according to this embodiment of the present invention.

FIG. 7 is flow diagram of a method for processing noises of a touch panel according to this embodiment of the present invention. Referring to FIG. 6 again, the first filtering circuit 610 receives the abnormal signal 640, and the second filtering circuit 620 receives the common voltage coupling signal 650 (in step S700). The first filtering circuit 610 permits the abnormal signal 640 that is greater than the reference voltage to pass so as to form the first filtering signal 660, and the first filtering signal 660 is transmitted to the comparison circuit 630. Also, the second filtering circuit 620 permits the common voltage coupling signal 650 that is greater than the reference voltage to pass so as to form the second filtering signal 670, and the second filtering signal 670 is transmitted to the comparison circuit 630 (in step S710). The comparison circuit 630 receives the first filtering signal 660 and the second filtering signal 670, and compares the first filtering signal 660 with the second filtering signal 670 so as to output the compared signal 680. For example, the comparison circuit 630 judges whether the first filtering signal 660 is greater than the second filtering signal 670 or not (in step S720). If the first filtering signal 660 is greater than the second filtering signal 670, the comparison circuit 630 outputs the high level signal (in step S730). If the first filtering signal 660 is not greater than the second filtering signal 670, the comparison circuit 630 outputs the low level signal (in step S740).

Figure 8:
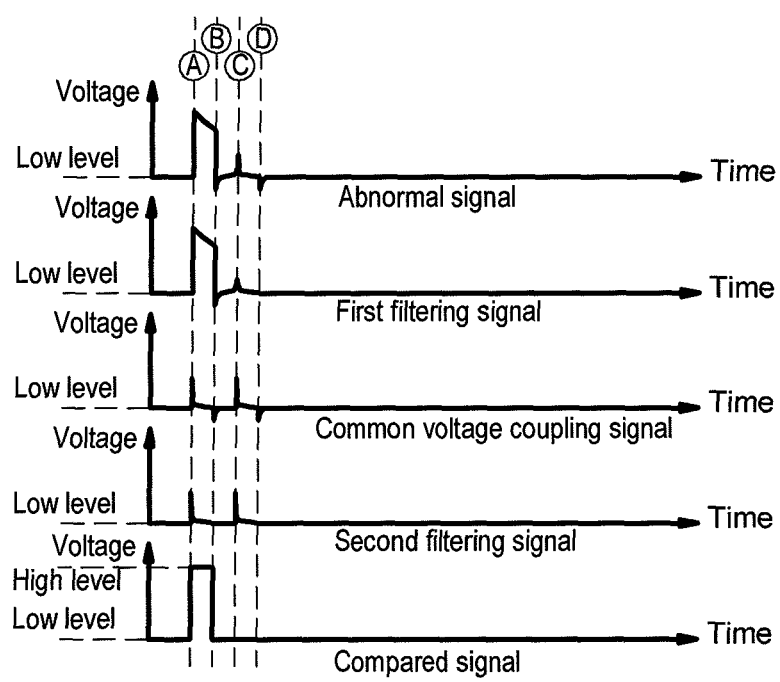
FIG. 8 shows timings of an abnormal signal, a first filtering signal, a common voltage coupling signal, a second filtering signal and a compared signal according to this embodiment of the present invention.

FIG. 8 shows timings of the abnormal signal 640, the first filtering signal 660, the common voltage coupling signal 650, the second filtering signal 670 and the compared signal 680 according to this embodiment of the present invention. There are four cases according to the positive phase and negative phase of the abnormal signal 640 and the common voltage coupling signal 650 as follows: The first case (A) is that the abnormal signal 640 and the common voltage coupling signal 650 are positive voltage signals, and the abnormal signal 640 is greater than the common voltage coupling signal 650. The second case (B) is that the abnormal signal 640 is a positive voltage signal, and the common voltage coupling signal 650 is a negative voltage signal, and the abnormal signal 640 is greater than the common voltage coupling signal 650. The third case (C) is that the abnormal signal 640 and the common voltage coupling signal 650 are positive voltage signals, and the abnormal signal 640 is smaller than the common voltage coupling signal 650. The fourth case (D) is that the abnormal signal 640 and the common voltage coupling signal 650 are negative voltage signals, and the abnormal signal 640 is greater than the common voltage coupling signal 650. More detailed, referring to FIGS. 6 and 8 again, they show actions and signals of circuit node of the noise processing unit in this embodiment. In the first case (A), both of the first operational amplifier IC1 and the second operational amplifier IC2 output the low level signals (e.g. 0 volt level), the second switch Q20, the third switch Q30, the fifth switch Q50 and the sixth switch Q60 are turn off, the first switch Q10 is turn on and outputs the first filtering signal 660 to the third operational amplifier IC3, and the fourth switch Q40 is turn on and outputs the second filtering signal 670 to the fourth operational amplifier IC4, wherein the first filtering signal 660 is greater than the second filtering signal 670 such that the third operational amplifier IC3 outputs the high level signal, and the fourth operational amplifier IC4 outputs the low level signal. The seventh switch Q70 is turn on, the eighth switch Q80 and the tenth switch Q100 are turn off, and the ninth switch Q90 is turn on and outputs the compared signal 680 being the high level signal.

In the second case (B), the first operational amplifier IC1 outputs the low level signal (e.g. 0 volt level), the second operational amplifier IC2 outputs the high level signal, the second switch Q20, the third switch Q30 and the fourth switch Q40 are turn off, the first switch Q10 is turn on and outputs the first filtering signal 660 to the third operational amplifier IC3, the fifth switch Q50 and the sixth switch Q60 are turn on and output the low level signals to the fourth operational amplifier IC4, wherein the first filtering signal 660 is greater than the low level signal such that the third operational amplifier IC3 outputs the high level signal, and the fourth operational amplifier IC4 outputs the low level signal. The seventh switch Q70 is turn on, the eighth switch Q80 and the tenth switch Q100 are turn off, and the ninth switch Q90 is turn on and outputs the compared signal 680 being the high level signal.

In the third case (C), both of the first operational amplifier IC1 and the second operational amplifier IC2 output the low level signals (e.g. 0 volt level), the second switch Q20, the third switch Q30, the fifth switch Q50 and the sixth switch Q60 are turn off, the first switch Q10 is turn on and outputs the first filtering signal 660 to the third operational amplifier IC3, and the fourth switch Q40 is turn on and outputs the second filtering signal 670 to the fourth operational amplifier IC4, wherein the first filtering signal 660 is smaller than the second filtering signal 670 such that the third operational amplifier IC3 outputs the low level signal, and the fourth operational amplifier IC4 outputs the high level signal. The eighth switch Q80 is turn on, the seventh switch Q70 and the ninth switch Q90 are turn off, and the tenth switch Q100 is turn on and outputs the compared signal 680 being the low level signal.

In the fourth case (D), both of the first operational amplifier IC1 and the second operational amplifier IC2 output the high level signals, both of the third switch Q30 and the sixth switch Q60 are turn on and output the low level signal (e.g. 0 volt level), the first switch Q10 and the fourth switch Q40 are turn off, the second switch Q20 is turn on and outputs the low level signal to the third operational amplifier IC3, and the fifth switch Q50 is turn on and outputs the low level signal to the fourth operational amplifier IC4, wherein all of the positive and negative input ends of the third operational amplifier IC3 and the fourth operational amplifier IC4 receive the low level signals such that both of the third operational amplifier IC3 and the fourth operational amplifier IC4 output the low level signal. The ninth switch Q90 and the tenth switch Q100 are turn off, the eighth switch Q80 is turn on, and the seventh switch Q70 is turn on and outputs the compared signal 680 being the low level signal.

In above-mentioned case (A), (B), (C) and (D), the compared signal outputted by the comparison circuit of the anti-noise unit of the present invention is the high level signal or low level signal of the normal sensing signal of the touch sensor, i.e., the anti-noise unit of the present invention certainly rejects the noise of the abnormal signal and transmits the normal sensing signal, whereby the noise generated by the LCD module which interferes with the touch sensor do not cause the touch panel to wrong determine the touch position. Thus, it is not necessary that the analog-to-digital converting frequency is adjusted and the algorithm of the microcontroller for processing signals is adjusted to solve the problem of wrong determining the touch position, whereby the touch panel of the present invention will not extend the processing time of the sensing signal from touch sensor to the operating system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An anti-noise unit adapted for a touch panel, the touch panel including a display module and a touch sensor, the display module generating a noise, the touch sensor outputting an abnormal signal, the abnormal signal including the noise and a sensing signal, the anti-noise unit comprising:
   a first filtering circuit adapted to receive the abnormal signal and permit the abnormal signal that is greater than a reference voltage to pass so as to form a first filtering signal;
   a second filtering circuit adapted to receive the noise and permit the noise that is greater than the reference voltage to pass so as to form a second filtering signal; and
   a comparison circuit adapted to receive the first filtering signal and the second filtering signal, and compares the first filtering signal with the second filtering signal so as to output a compared signal, wherein the compared signal is the sensing signal;

wherein the first filtering circuit comprises:
   a first operational amplifier whose a positive phase input end adapted to receive the reference voltage, and a negative phase input end adapted to receive the abnormal signal wherein the first operational amplifier compares the abnormal signal with the reference voltage, and an output end of the first operational amplifier outputs a compared result;
   a first switch comprising:
      a first end adapted to receive the abnormal signal;
      a second end adapted to output a first filtering signal; and
      a control end electrically connected to the output end of the first operational amplifier, thereby controlling whether the first end of the first switch electrically contacts the second end of the first switch or not;
   a second switch comprising:
      a first end electrically connected to the second end of the first switch;
      a second end electrically connected to the reference voltage; and
      a control end electrically connected to the output end of the first operational amplifier, thereby controlling whether the first end of the second switch electrically contacts the second end of the second switch or not; and
   a third switch comprising:
      a first end electrically connected to the second end of the first switch;
      a second end electrically connected to the reference voltage; and
      a control end adapted to receive the abnormal signal, thereby controlling whether the first end of the third switch electrically contacts the second end of the third switch or not.

2. The anti-noise unit adapted for the touch panel according to claim 1, wherein the second filtering circuit comprises:
   a second operational amplifier whose a positive phase input end adapted to receive the reference voltage, and a negative phase input end adapted to receive the noise, wherein the second operational amplifier compares the noise with the reference voltage, and an output end of the second operational amplifier outputs a compared result;
   a fourth switch comprising:
      a first end adapted to receive the noise;
      a second end adapted to output a second filtering signal; and
      a control end electrically connected to the output end of the second operational amplifier, thereby controlling whether the first end of the fourth switch electrically contacts the second end of the fourth switch or not;
   a fifth switch comprising:
      a first end electrically connected to the second end of the fourth switch;
      a second end electrically connected to the reference voltage; and
      a control end electrically connected to the output end of the second operational amplifier, thereby controlling whether the first end of the fifth switch electrically contacts the second end of the fifth switch or not; and
   a sixth switch comprising:
      a first end electrically connected to the second end of the fourth switch;
      a second end electrically connected to the reference voltage; and a control end adapted to receive the noise, thereby controlling whether the first end of the sixth switch electrically contacts the second end of the sixth switch or not.

3. The anti-noise unit adapted for the touch panel according to claim 2, wherein the comparison circuit comprises:
a third operational amplifier whose a positive phase input end adapted to receive the first filtering signal of the first filtering circuit, and a negative phase input end adapted to receive the second filtering signal of the second filtering circuit, wherein the third operational amplifier compares the first filtering signal with the second filtering signal, and an output end of the third operational amplifier outputs a compared result;
a fourth operational amplifier whose a negative phase input end adapted to receive the first filtering signal, and a positive phase input end adapted to receive the second filtering signal, wherein the fourth operational amplifier compares the first filtering signal with the second filtering signal, and an output end of the fourth operational amplifier outputs a compared result;
a seventh switch comprising:
a first end;
a second end; and
a control end electrically connected to the output end of the fourth operational amplifier, thereby controlling whether the first end of the seventh switch electrically contacts the second end of the seventh switch or not;
a eighth switch comprising:
a first end electrically connected to the second end of the seventh switch;
a second end electrically connected to the reference voltage; and
a control end electrically connected to the output end of the third operational amplifier, thereby controlling whether the first end of the eighth switch electrically contacts the second end of the eighth switch or not; and
a ninth switch comprising:
a first end electrically connected to a high level signal;
a second end electrically connected to the first end of the seventh switch for outputting a compared signal; and
a control end electrically connected to the output end of the third operational amplifier, thereby controlling whether the first end electrically contacts the second end of the ninth switch or not; and
a tenth switch comprising:
a first end electrically connected to the second end of the ninth switch for outputting the compared signal;
a second end electrically connected to the reference voltage; and
a control end electrically connected to the output end of the fourth operational amplifier, thereby controlling whether the first end electrically contacts the second end of the tenth switch or not.

4. A touch panel, comprising:
a display module generating a noise;
a touch sensor disposed above the display module and outputting an abnormal signal, wherein the abnormal signal includes the noise and a sensing signal;
an anti-noise unit adapted to receive the abnormal signal and then reject the noise of the abnormal signal so as to form normal sensing signal, wherein the anti-noise unit comprises:

a first filtering circuit adapted to receive the abnormal signal and permit the abnormal signal that is greater than a reference voltage to pass so as to form a first filtering signal;
a second filtering circuit adapted to receive and permit the noise that is greater than the reference voltage to pass so as to form a second filtering signal; and
a comparison circuit adapted to receive the first filtering signal and the second filtering signal, and compares the first filtering signal with the second filtering signal so as to output the compared signal, wherein the compared signal is the sensing signal; and
a signal processing unit adapted to process the sensing signal;
wherein the first filtering circuit comprises:
a first operational amplifier whose a positive phase input end adapted to receive the reference voltage, and a negative phase input end adapted to receive the abnormal signal, wherein the first operational amplifier compares the abnormal signal with the reference voltage, and an output end of the first operational amplifier outputs a compared result;
a first switch comprising:
a first end adapted to receive the abnormal signal;
a second end adapted to output a first filtering signal; and
a control end electrically connected to the output end of the first operational amplifier, thereby controlling whether the first end of the first switch electrically contacts the second end of the first switch or not;
a second switch comprising:
a first end electrically connected to the second end of the first switch;
a second end electrically connected to the reference voltage; and
a control end electrically connected to the output end of the first operational amplifier, thereby controlling whether the first end of the second switch electrically contacts the second end of the second switch or not; and
a third switch comprising:
a first end electrically connected to the second end of the first switch;
a second end electrically connected to the reference voltage; and
a control end adapted to receive the abnormal signal, thereby controlling whether the first end of the third switch electrically contacts the second end of the third switch or not.

5. A method for processing a noise of a touch panel, the touch panel including a display module and a touch sensor, the display module generating a noise, the touch sensor outputting an abnormal signal, the abnormal signal including the noise and a sensing signal, the method comprising the following steps of:
providing a first filtering circuit adapted to receive the abnormal signal and permitting the abnormal signal that is greater than a reference voltage to pass so as to form a first filtering signal;
receiving noise and permitting the noise that is greater than the reference voltage to pass so as to form a second filtering signal; and
receiving the first filtering signal and the second filtering signal, and comparing the first filtering signal with the second filtering signal so as to output a compared signal, wherein the compared signal is the sensing signal;
wherein the first filtering circuit comprises:

a first operational amplifier whose a positive phase input end adapted to receive the reference voltage and a negative phase input end adapted to receive the abnormal signal, wherein the first operational amplifier compares the abnormal signal with the reference voltage, and an output end of the first operational amplifier outputs a compared result;

a first switch comprising:
- a first end adapted to receive the abnormal signal;
- a second end adapted to output a first filtering signal; and
- a control end electrically connected to the output end of the first operational amplifier, thereby controlling whether the first end of the first switch electrically contacts the second end of the first switch or not;

a second switch comprising:
- a first end electrically connected to the second end of the first switch;
- a second end electrically connected to the reference voltage; and
- a control end electrically connected to the output end of the first operational amplifier, thereby controlling whether the first end of the second switch electrically contacts the second end of the second switch or not; and a third switch comprising:
- a first end electrically connected to the second end of the first switch;
- a second end electrically connected to the reference voltage; and
- a control end adapted to receive the abnormal signal, thereby controlling whether the first end of the third switch electrically contacts the second end of the third switch or not.

6. The method for processing a noise of a touch panel according to claim 5, wherein the noise is a common voltage coupling signal resulted from a couple effect between a common voltage of the display module and data lines.

7. The method for processing a noise of a touch panel according to claim 5, further comprising the following steps of:
   outputting a high level signal, when the first filtering signal is greater than the second filtering signal.

8. The method for processing a noise of a touch panel according to claim 5, further comprising the following steps of:
   outputting a low level signal, when the first filtering signal is not greater than the second filtering signal.

* * * * *